Figure 1:
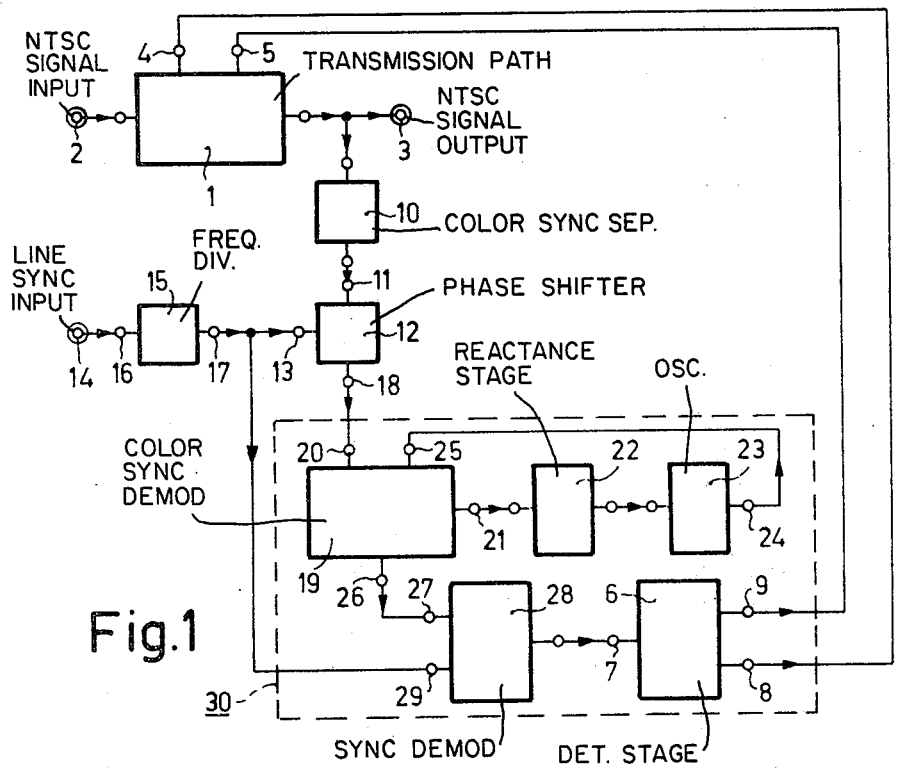

United States Patent [19]

Kormann et al.

[11] 3,990,104
[45] Nov. 2, 1976

[54] CIRCUIT ARRANGEMENT FOR AMPLITUDE CONTROLLING AN NTSC CHROMINANCE SIGNAL WITH HIGH NOISE IMMUNITY

[75] Inventors: Harro Kormann; Dietfried Susz, both of Vienna, Austria

[73] Assignee: U.S. Philips Corporation, New York, N.Y.

[22] Filed: Mar. 28, 1975

[21] Appl. No.: 562,901

[30] Foreign Application Priority Data
Apr. 10, 1974 Austria .............................. 2995/74

[52] U.S. Cl. ..................................... 358/26; 358/27
[51] Int. Cl.² ........................................... H04N 9/49
[58] Field of Search ......................... 358/18, 24–27

[56] References Cited
UNITED STATES PATENTS

| | | | |
|---|---|---|---|
| 3,548,084 | 12/1970 | Kroner | 358/26 |
| 3,549,792 | 12/1970 | Barclay | 358/17 |
| 3,717,726 | 2/1973 | Howe | 358/26 |
| 3,770,883 | 11/1973 | Sugihara | 358/24 |

*Primary Examiner*—Robert L. Richardson
*Assistant Examiner*—Aristotelis M. Psitos
*Attorney, Agent, or Firm*—Frank R. Trifari; Henry I. Steckler

[57] ABSTRACT

Circuit arrangement for processing a NTSC chrominance signal in which the NTSC color synchronizing signal is modulated in phase so that PAL demodulation techniques may be used for obtaining a low-noise amplification control voltage and/or a low-noise color killing voltage.

6 Claims, 2 Drawing Figures

CIRCUIT ARRANGEMENT FOR AMPLITUDE CONTROLLING AN NTSC CHROMINANCE SIGNAL WITH HIGH NOISE IMMUNITY

The invention relates to a circuit arrangement for processing an NTSC chrominance signal which includes a colour synchronising signal demodulator for obtaining a control signal from which a control voltage for controlling the degree of amplification of the chrominance signal and/or a colour killer voltage for possibly blocking a transmission path for the chrominance signal can be derived. In such known circuit arrangements for NTSC systems, in order to obtain the control signal the colour synchronizing signal is separated from the NTSC chrominance signal and demodulated by the colour synchronizing signal demodulator to obtain a direct voltage which, for example, is proportional to the amplitude of the colour synchronizing signal and forms the control signal. In the process of demodulating the colour synchronizing signal, interference signals present in the colour synchronizing signal are also rectified, resulting in a disturbed control signal. Hence the interference signals adversely affect the control of the amplification of the chrominance signal amplifier and/or the colour killing. The latter effect is particularly troublesome if the signal-to-noise ratio in the colour synchronizing signal is unfavourable, because it may cause the omission of colour killing action when no chrominance signal is received. It is known that in circuit arrangements for handling PAL colour television signals the said difficulties can be avoided substantially entirely.

It is an object of the present invention to reduce the above-mentioned disadvantages in a simple manner when processing NTSC colour television signals also. For this purpose a circuit arrangement of the aforementioned type according to the invention is characterized in that it includes a divider stage for converting a signal at line frequency into a signal at a divided frequency, for example at one half of the line frequency, which is applied to a control input of a phase shifting stage which is further fed with a signal comprising at least the colour synchronizing signal, so that a colour synchronizing signal is obtained which is modulated in phase at the frequency of the signal applied to the control input, the said phase-modulated colour synchronizing signal being applied to an input of a synchronous colour synchronizing signal detector an output signal of which having the divided frequency is applied to a detection stage to obtain the control signal. The said steps provide a control signal the noise content of which is reduced in a considerably higher degree than has been possible hitherto in NTSC systems. As a result, the control voltage for controlling the degree of amplification of the chrominance signal and the colour killing voltage also contain less noise, so that these two voltages are substantially prevented from giving rise to erroneous operation.

It should be mentioned that it is known for PAL systems to apply a colour synchronizing signal which has been phase-modulated in the transmitter to a synchronous colour synchronizing signal detector an output signal of which is applied to a detection stage for obtaining the control signal. The basic idea of the invention is to adapt such steps which are known from PAL systems and provide considerable freedom from interference, to use in NTSC systems in that according to the invention in NTSC systems also the phase of the colour synchronizing signal is changed over and only then is this signal used for obtaining the control signal. This also enables component parts or groups of component parts generally employed in PAL receivers to be used in NTSC receivers and further receivers adapted to be switched from PAL to NTSC to be simply designed.

It is of particular advantage to use as a detection stage a synchronous demodulator to one input of which an output signal from the colour synchronising signal demodulator and to another input of which the signal converted by the divider stage are applied. Thus a particularly high freedom of interference is achieved in NTSC receivers also.

Figure 2:
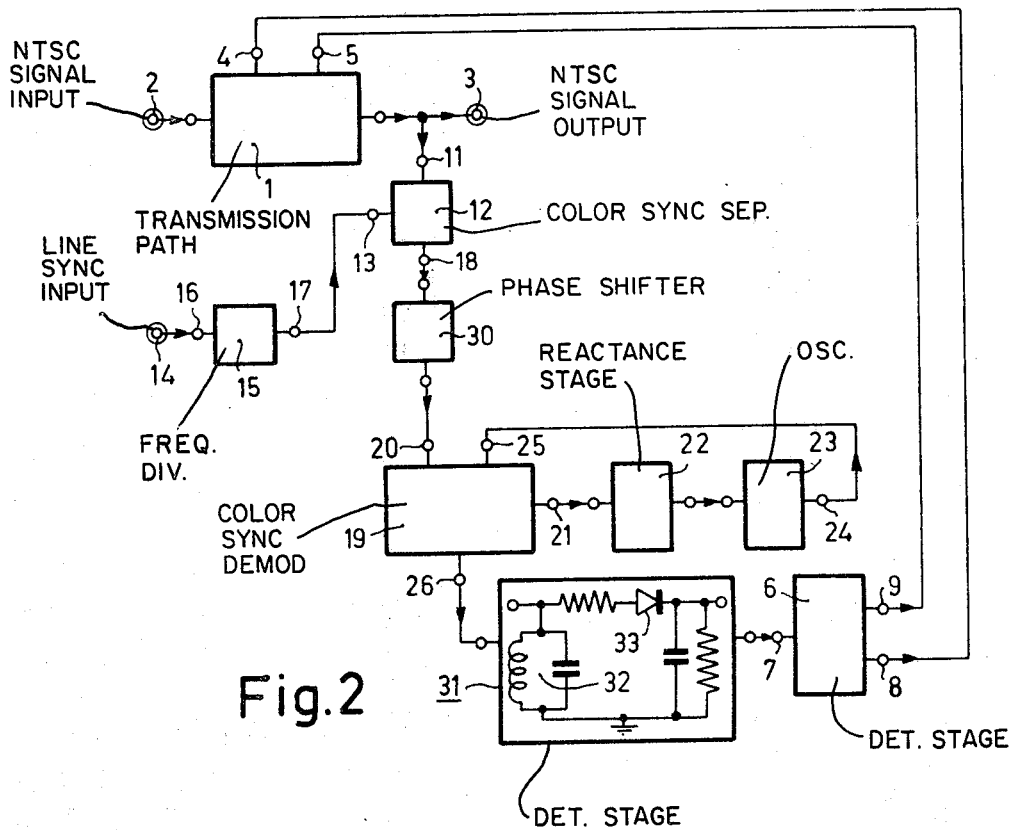

Embodiments of the invention will now be described, by way of example, with reference to the accompanying diagrammatic drawings, in which:

FIG. 1 is a block schematic diagram of a circuit arrangement according to the invention in which the colour synchronizing signal only is changed over in phase and which has a synchronous demodulator as a detection stage, and FIG. 2 is a block schematic diagram of a circuit arrangement in which the chrominance signal is changed over in phase whilst a simpler detection stage is used.

Referring now to FIG. 1, reference numeral 1 denotes a transmission path for a NTSC chrominance signal which can be applied to an input 2 and be derived rom an output 3. In this transmission path the chrominance signal can be controlled in amplitude, for which purpose a control voltage can be applied to the transmission path via a terminal 4. The transmission path further can be blocked by means of a colour killing voltage when the amplitude of the colour synchronising signal exceeds a given threshold value. This colour killing voltage can be applied to a terminal 5. Such a transmission path may be used, for example, in a NTSC colour television receiver, an apparatus for recording and/or displaying NTSC colour television signals or in general in an apparatus in which a NTSC chrominance signal is to be controlled in amplitude.

To obtain the control voltage and the colour killing voltage, a control voltage is required which is derived from the colour synchronising signal and is to be as free as possible from noise contained in this colour synchronizing signal. Deriving the control voltage and the colour killing voltage from the control signal is effected in a detection stage 6 to an input 7 of which the control signal is applied and which delivers the control voltage at an output 8 and the colour killing voltage at an output 9.

To an output of the transmission path 1 at which the NTSC chrominance signal appears, a separating stage 10 for obtaining the colour synchronising signal is connected. The output signal from this stage is applied to an input 11 of a phase change-over stage or phase-modulator 12. To a control input 13 of the phase change-over stage 12 a signal is applied by which the phase of the colour synchronising signal is changed over by a predetermined amount at the frequency of this signal. In view of the phase conditions generally used in PAL systems, the said amount is preferably chosen to be ± 45°. The signal applied to the control input 13 is obtained by frequency division in a divider stage 15 the signal which is produced at the terminal 14 at the frequency of the line synchronising pulses is applied. As a result, at an output 17 of the divider stage 15 a signal is produced the frequency of which in this embodiment has been reduced by half and hence is one half of the line frequency. Thus at the output 18 of the phase change-over stage 12 a colour synchronising signal is obtained the phase of which is alternately changed over at each line, as is the case in PAL systems. This signal is used for obtaining the control signal for the aforementioned processing of the NTSC chrominance signal.

Obtaining the control signal may be effected by means of circuit arrangements generally used in PAL receivers. A synchronous colour synchronising signal demodulator 19 has the output signal from the phase change-over stage 12 applied to an input 20 and by an output signal produced at its output 21 controls the reactance stage 22 of a reference oscillator 23 which oscillates at the frequency of the colour synchronising signal. The oscillator signal at an output 24 of the reference oscillator 23 is applied to a further input 25 of the demodulator 19 so that the reference oscillator 23 is controlled in frequency and in phase. From a further output 26 of the demodulator 19 an alternating-voltage component is dervided which, as is known, is proportional to the amplitude of the colour synchronising signal and still may contain noise. This alternating-voltage component is applied to a synchronous demodulator 28 which acts as a detection stage and to the other input 29 of which the signal at one half of the line frequency from the divider stage 15 is applied. Thus at the output 30 of the synchronous demodulator the control signal appears which owing to the additional filtering action in the synchronous demodulator is substantially free from noise. This control signal is applied to the input 7 of the stage 6 in which the control voltage and the colour killing voltage are produced.

The above-described chrominance signal processing circuit for use in NTSC systems consequently provides advantages obtainable in PAL systems. The circuit element 19, 22, 23, 28 and 6 may be combined to form a signle unit 30a which may be manufactured in integrated-circuit form. Such a unit for use in PAL colour television receivers is commercially available. According to the invention this unit may also be used for NTSC receivers with the sole addition of the divider stage 15 and the phase change-over stage 12.

It should be mentioned that the amount by which the phase change-over stage alternately changes over the phase of the colour synchronising signal from line to line can be freely chosen within maximum limits of ± 90° and hence the phase may be changed-over between 0° and 90°. Furthermore it is not absolutely necessary for the divider stage to divide the frequency by two, although this is a highly advantageous choice. If desired any divisor in excess of unity may be used.

In the embodiment shown in FIG. 2 the NTSC chrominance signal derived from the output of the transmission path 1 is applied to the input 11 of the phase-change-over stage 12 to the control input 13 of which again a signal at one half of the line frequency is applied which is derived from a divider stage 15. The phase change-over stage 12 which produces the signal which alternately is changed in phase from line to line is followed by a separating stage 30 which produces the colour synchronising signal changed-over in phase which is used to obtain the control signal. For this purpose in this embodiment a synchronous demodulator 19 is again provided which cooperates with a reactance stage 22 and a reference oscillator 23, however, for the sake of simplicity in this embodiment the detector stage 31 comprises a high-quality resonant circuit 32 followed by a rectifier circuit 33. The resonant circuit 32 is tuned to one half of the line frequency in accordance with the divisor of the divider stage 15. Thus the control signal has a greater freedom from noise than the conventional circuit arrangements for NTSC systems, because the resonant circuit 32 provides additional filter action. Such a detection stage is also used in some PAL systems.

Obviously the aforedescribed embodiments may be modified in a variety of manners without departing from the scope of the invention. For example, it is not absolutely necessary to use the same demodulator for controlling the phase of the reference oscillator and for providing a signal component of the divided frequency. In this connection it should be mentioned that the basic idea of the invention is that in NTSC systems an additional change-over of the phase of the colour synchronising signal is performed and subsequently circuitry steps may be taken which in themselves are known in PAL systems for obtaining a control signal for amplification control of the chrominance signal and/or for obtaining a colour killing voltage by which the transmission path for the chrominance signal may be blocked, permitting for such a circuit arrangement according to a NTSC system substantially the same advantages to be obtained as in such circuit arrangements for a PAL system.

What is claimed is:

1. A circuit for processing a color television signal having color synchronizing and line frequency synchronizing components, said circuit comprising a phase change over stage having an input means for receiving at least the color synchronizing component of an NTSC chrominance signal, a control input, and an output; a frequency synchronizing divider having an input means for receiving said line frequency signal and an output coupled to said control input; a synchronous color synchronizing signal detector having an input coupled to said change over stage output and an output; a first detection stage coupled to said color synchronizing signal detector output; and a second detector stage coupled to said first detection stage and having an output means for providing a signal for control of the amplitude of said chrominance signal or a color killer.

2. A circuit as claimed in claim 1 wherein said first detector stage comprises a synchronous demodulator having a first input coupled to said color synchronizing signal detector output and a second input coupled to said divider output.

3. A circuit as claimed in claim 1 wherein said first detection stage comprises a resonant circuit and a rectifier coupled to said resonant circuit.

4. A circuit as claimed in claim 3 wherein said divider divides by a factor of two and said resonant circuit is resonant at one half of said line frequency.

5. A circuit as claimed in claim 1 wherein said divider divides by a factor of two.

6. A circuit as claimed in claim 1 wherein said phase change over stage comprises a phase modulator.

* * * * *